(12) United States Patent
Cassel et al.

(10) Patent No.: US 8,678,348 B1
(45) Date of Patent: Mar. 25, 2014

(54) GAS FLOW CONTROL VALVE

(71) Applicant: Landtec International Holdings, LLC, Colton, CA (US)

(72) Inventors: Mitchal Cassel, Redlands, CA (US); Jamie Tooley, Beaumont, CA (US); Scott Marcell, Banning, CA (US)

(73) Assignee: Landtec International Holdings, LLC, Colton, CA (US)

( * ) Notice: Subject to any disclaimer, the term of this patent is extended or adjusted under 35 U.S.C. 154(b) by 0 days.

(21) Appl. No.: 13/969,431

(22) Filed: Aug. 16, 2013

Related U.S. Application Data

(60) Provisional application No. 61/842,240, filed on Jul. 2, 2013.

(51) Int. Cl.
*F16K 31/44* (2006.01)

(52) U.S. Cl.
USPC .............................. 251/223; 251/122; 137/556

(58) Field of Classification Search
USPC ......... 251/223, 225, 221, 346, 122, 296, 339; 137/553, 556
See application file for complete search history.

(56) References Cited

U.S. PATENT DOCUMENTS

| | | | | |
|---|---|---|---|---|
| 191,500 A | * | 5/1877 | Wiegand | 251/225 |
| 1,684,835 A | * | 9/1928 | Larsen | 251/273 |
| 1,786,885 A | * | 12/1930 | Bancroft | 137/454.2 |
| 2,218,419 A | * | 10/1940 | Chapman | 251/223 |
| 3,237,917 A | * | 3/1966 | Kunzer et al. | 251/214 |
| 3,334,654 A | * | 8/1967 | Donner | 137/553 |
| 3,434,694 A | * | 3/1969 | Skinner | 251/215 |
| 3,765,364 A | * | 10/1973 | Booth | 114/198 |
| 4,114,851 A | * | 9/1978 | Shivak et al. | 251/88 |
| 4,118,007 A | * | 10/1978 | Scapes | 251/223 |
| 4,146,050 A | * | 3/1979 | Graves | 137/375 |
| 4,177,971 A | * | 12/1979 | Landamore | 251/215 |
| 4,417,601 A | * | 11/1983 | Bennett | 137/556.6 |
| 6,095,496 A | | 8/2000 | Rydin et al. | |
| 7,287,551 B2 | | 10/2007 | James | |
| 8,038,121 B2 | | 10/2011 | Gessaman | |
| 8,276,611 B2 | | 10/2012 | Swab et al. | |
| 8,353,310 B2 | | 1/2013 | Lin et al. | |
| 2010/0117017 A1 | | 5/2010 | Freyre | |
| 2010/0140520 A1 | | 6/2010 | Millius | |
| 2010/0282325 A1 | | 11/2010 | Cimino | |
| 2012/0261601 A1 | | 10/2012 | Colby et al. | |
| 2012/0305817 A1 | | 12/2012 | Burger et al. | |

\* cited by examiner

*Primary Examiner* — John K Fristoe, Jr.
*Assistant Examiner* — Andrew J Rost
(74) *Attorney, Agent, or Firm* — Knobbe, Martens, Olson & Bear LLP

(57) ABSTRACT

A gas flow control valve comprising coupling means for coupling to a measurement tube, wherein the coupling means are compatible with existing means for coupling valves to the measurement tube, means for directing gas from a well head through the gas flow control valve and out of an exit port, means for finely tuning the flow rate of gas passing through the flow control valve comprising, means for longitudinally translating a valve needle via rotation of a rotating assembly, wherein the valve needle comprises a tapered portion and a shoulder, wherein the tapered portion of the valve needle comprises a truncated cone which increases in diameter in the direction of gas flow, and means for visually indicating the longitudinal position of the gas flow control valve.

17 Claims, 9 Drawing Sheets

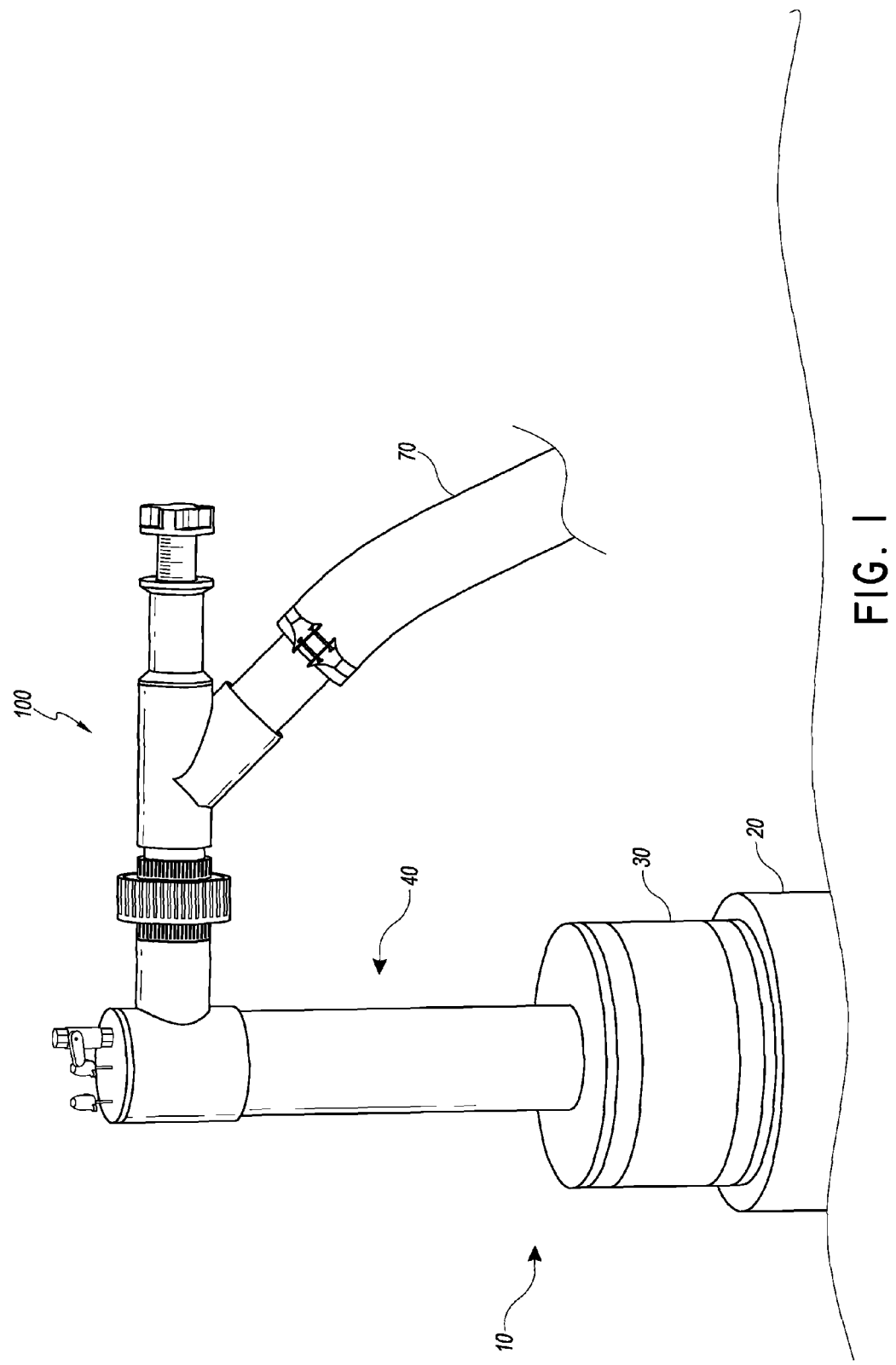

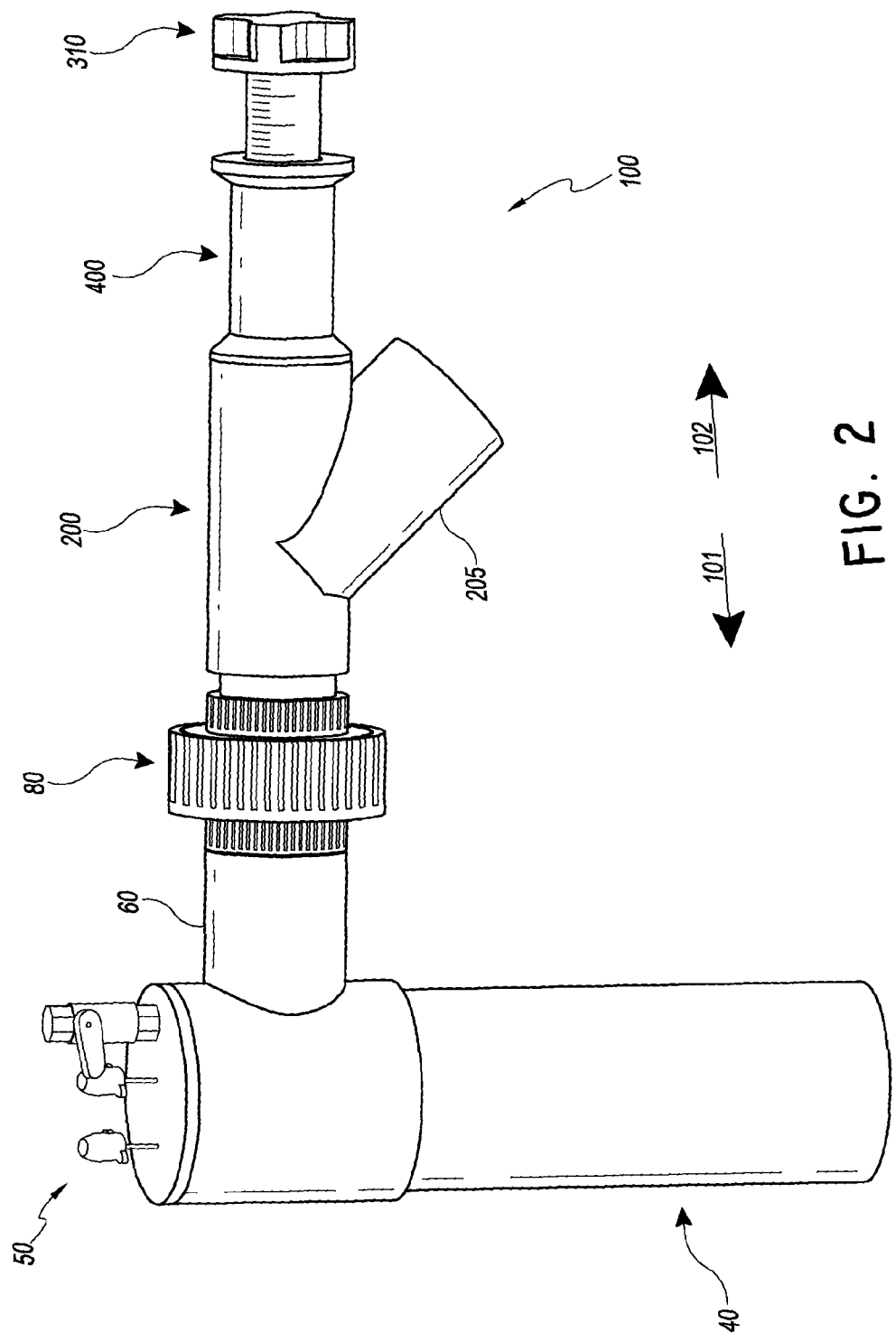

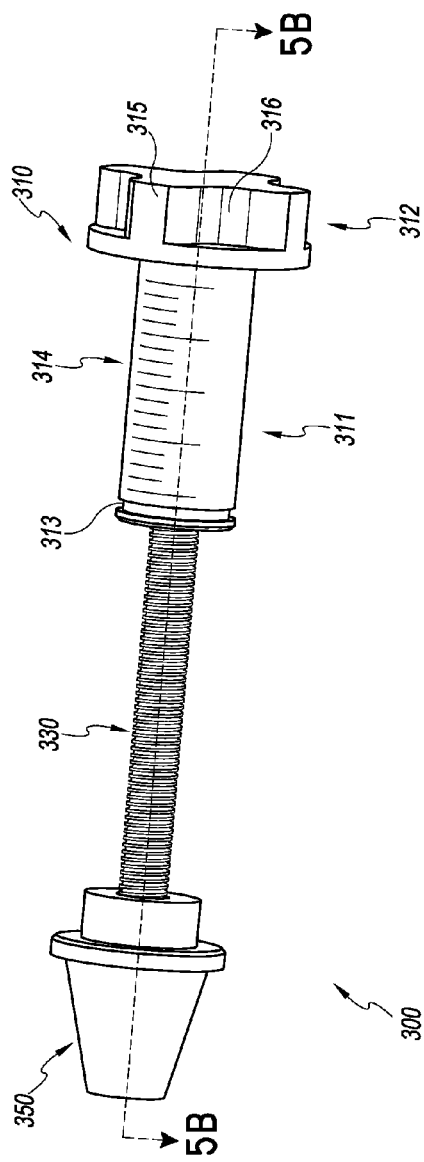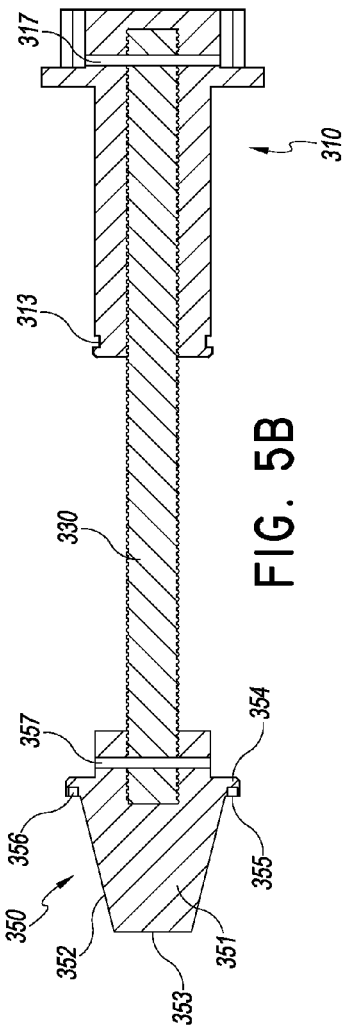

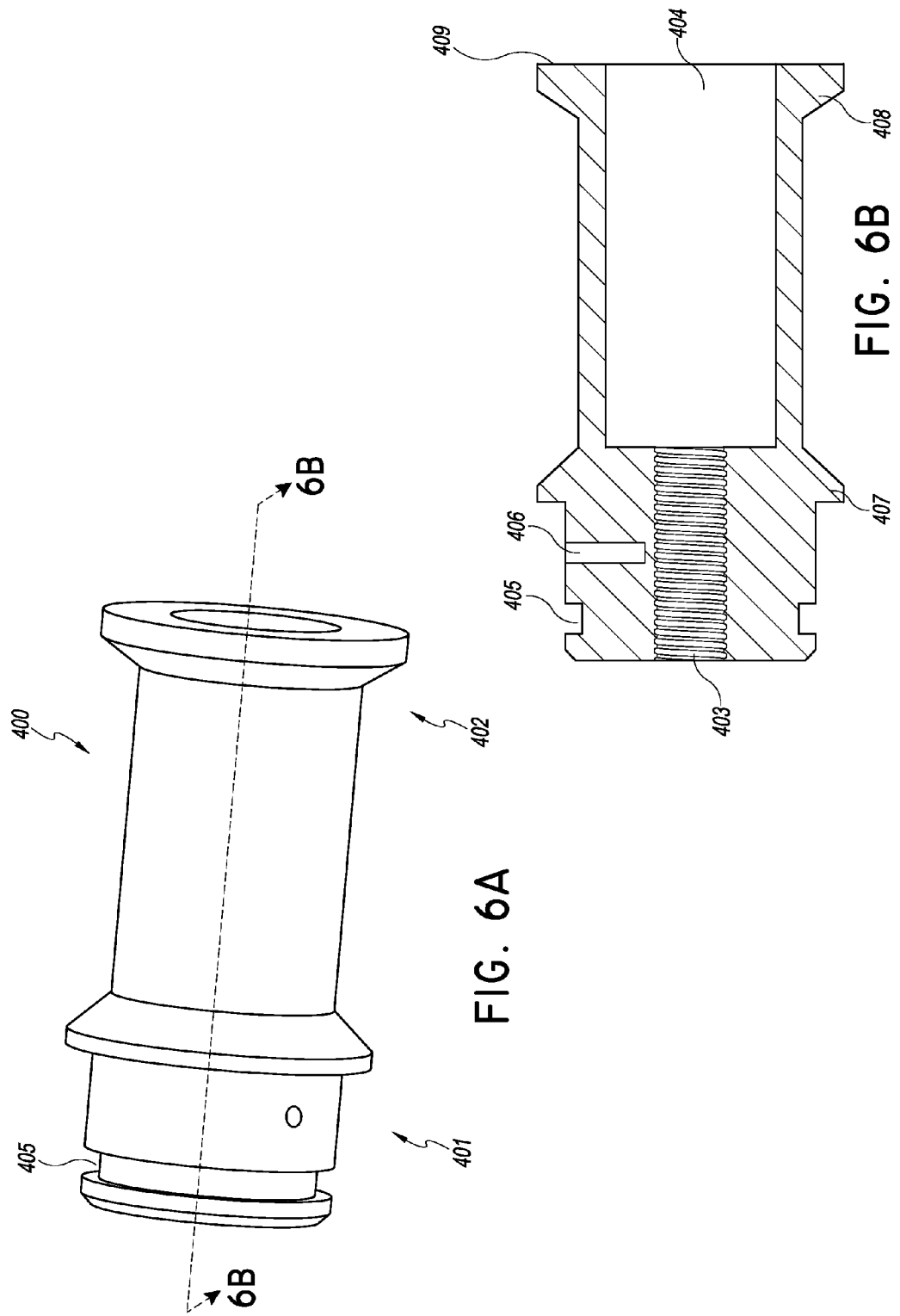

GAS FLOW CONTROL VALVE

TECHNICAL FIELD

The present technology relates to gas flow control valves and, in particular, flow control valves configured to finely tune the flow rate of gas extraction from solid waste landfills.

DESCRIPTION OF THE RELATED TECHNOLOGY

To provide some background, once municipal solid waste is disposed of at a landfill, the organic fraction of the waste begins to decompose. This decomposition first proceeds through an aerobic biodegradation process where all the available oxygen in the buried waste is consumed. The decomposition then proceeds through a strictly anaerobic biodegradation process where the principle constituents of landfill gas are formed. Landfill gas consists of approximately 55% methane, 44% carbon dioxide and less than 1% trace gases. The trace gases consist of a wide variety of volatile organic compounds, which vary depending on the particular landfill. Noteworthy is the fact that oxygen is toxic to the microorganisms typically responsible for methane gas generation.

Since landfill gas is constantly being produced as a result of waste decomposition, landfill gas will move from the buried waste towards the ground surface and will result in surface emissions to the atmosphere. The constant generation of landfill gas also results in a flushing or purging action within the subsurface that results in the removal of air, thus further facilitating the anaerobic biodegradation process.

Surface emissions of landfill gas is not a desirable condition because the primary constituents of landfill gas are well known greenhouse gases, which are thought to be contributing towards global warming. In addition, the trace gases present in landfill gas are believed to participate in an atmospheric photochemical reaction that leads to the formation of ozone, a principle constituent of smog.

In addition to surface emissions, landfill gas may also move or migrate laterally in the subsurface away from the buried decomposing waste, and may accumulate in near-by buildings or other structures. This condition creates a potentially dangerous condition due to the methane content of landfill gas. When methane is present in a concentration ranging from approximately 5 to 20 percent by volume it is potentially explosive. Another issue associated with subsurface migration of landfill gas is that it may also come into contact with groundwater and create the potential for groundwater contamination due to the presence of contaminating trace gases. Thus it is desirable to collect landfill gas to prevent these negative environmental effects. It is also desirable to collect landfill gas for energy recovery purposes, as the methane content of landfill gas can be relatively easily used as a fuel.

Active landfill gas well extraction systems are used to control landfill gas surface emissions, control landfill gas subsurface migration away from the landfill, and often to collect landfill gas for energy recovery. These systems typically include an array of both vertical and horizontal landfill gas extraction wells that are in fluid communication with a common header piping system. The header piping system is, in turn, fluidly connected to a vacuum source, typically a centrifugal blower or other similar turbo-machine. Following extraction by the system, the gas may be incinerated by a flare, may be directly used as a fuel, or may be conditioned and then used as a fuel.

The landfill extraction system wells are either drilled or trenched into the landfill waste column and they consist of both perforated-piping sections and solid-piping sections. The solid piping section is nearest the surface of the landfill. The perforated-piping section is the deeper piping. The point at which the solid piping changes to perforated piping is a major design consideration for an extraction well, since it significantly influences the maximum allowable suction that can be applied to each well.

Each extraction well is in fluid communication with a header piping system through a wellhead assembly. The wellhead assembly typically consists of a gate valve used for throttling the volumetric flow rate of landfill gas from the extraction well and a sample collection port. The wellhead may also include a flow rate measurement device.

An operating goal of the landfill gas well extraction system is to remove gas at the approximate rate of its generation. The rational for this goal is the consequence of over- or under-extraction rates. Under-extraction rates mean the extraction rate is not high enough to prevent gas from reaching the surface or prevent subsurface migration. This results in air pollution, or a fire hazard. Over-extraction rates mean the extraction rate is high enough to draw large amounts of air into the waste column. This may cause a subsurface fire, and will kill many of the microorganisms responsible for the formation of methane, resulting in reduced methane recovery. Consequently, the gas flow rate from each individual extraction well, or group of adjacent wells, needs to be carefully monitored and controlled within a narrow operating range to prevent over- or under-extraction of landfill gas.

SUMMARY

The systems, methods and devices described herein have innovative aspects, no single one of which is indispensable or solely responsible for their desirable attributes. Without limiting the scope of the claims, some of the advantageous features will now be summarized.

One aspect of the present invention is the realization that existing gas valves do not provide the capability for a technician to finely tune the flow rate of gas through the valve in the field. Thus, there exists a need for a flow control valve which allows for fine tuning of gas flow rate in the field.

One non-limiting embodiment of the present invention includes a gas flow control valve comprising a valve body having a central bore and an exit port, the central bore of the valve body having a valve body central axis, the exit port having an exit bore in fluid communication with the central bore, the exit port of the valve body having an exit port central axis, the exit port central axis of the exit port angled between 20 and 85 degrees relative to the valve body central axis; wherein the valve body has a proximal portion and a distal portion, wherein gas enters the valve body through the proximal portion and exits through the exit port; a threaded member having a proximal portion and a distal portion, the proximal portion of the threaded member affixed to the distal portion of the valve body, the threaded member having a threaded member central axis collinear with the valve body central axis, the threaded member comprising a threaded bore and a sliding bore, the threaded bore entering from the proximal portion of the threaded member and the sliding bore entering from the distal portion of the threaded member, the threaded bore in fluid communication with the sliding bore; a rotating assembly configured to rotate about the valve body central axis and to translate along the valve body central axis, the rotating assembly comprising a handle affixed to a threaded shaft affixed to a valve needle, the handle including a proximal portion and a distal portion, the proximal portion of the handle configured to slide within the sliding bore of the threaded member, the proximal portion including measurement indicia configured to indicate the longitudinal position of the rotating assembly relative to the threaded member; wherein the threaded bore of the threaded member is configured to accept the threaded shaft of the rotating assembly and wherein rotation of the rotating assembly relative to the threaded member causes the rotating assembly to translate relative to the threaded member; wherein the valve body includes a valve seat configured to receive the valve needle of the rotating assembly such that translation of the valve needle relative to the valve seat alters the flow rate of gas travelling through the gas flow control valve; wherein the exit bore of the exit port is located distally from the valve seat of the valve body; wherein the valve needle comprises a tapered portion; and wherein the sliding bore of the threaded member is configured to accept the proximal portion of the handle of the rotating assembly.

According to additional embodiments, the tapered portion of the valve needle increases in diameter in the direction of gas flow.

According to additional embodiments, the tapered portion of the valve needle comprises a truncated cone.

According to additional embodiments, the valve needle further comprises a shoulder protruding outwards from the center of the valve needle, wherein the shoulder is configured to seal with the valve seat when the flow control valve is in a closed position.

According to additional embodiments, the shoulder comprises a proximal face, wherein the proximal face comprises a sealing recess configured to accept a sealing member configured to seal against the valve seat.

According to additional embodiments, the exit port central axis of the exit port angled between 40 and 50 degrees relative to the valve body central axis.

According to additional embodiments, the threaded bore of the threaded member and the threaded shaft have a thread pitch configured such that at least 6 turns of the rotating assembly is required to span an adjustable range of flow rate provided by the gas flow control valve.

According to additional embodiments, the proximal portion of the handle comprises a sealing recess configured to receive a sealing device configured to seal the sliding bore of the threaded member.

According to additional embodiments, the measurement indicia of the handle are configured to be read relative to a distal surface of the threaded member.

According to additional embodiments, wherein the flow control valve is configured to quickly and easily couple to an existing measurement tube via a union.

Another non-limiting embodiment of the present invention includes a gas flow control valve comprising: coupling means for coupling to a measurement tube; wherein the coupling means are compatible with existing means for coupling valves to the measurement tube; means for directing gas from a well head through the gas flow control valve and out of an exit port; means for finely tuning the flow rate of gas passing through the flow control valve comprising: means for longitudinally translating a valve needle via rotation of a rotating assembly; wherein the valve needle comprises a tapered portion and a shoulder, wherein the tapered portion of the valve needle comprises a truncated cone which increases in diameter in the direction of gas flow; and means for visually indicating the longitudinal position of the gas flow control valve.

According to additional embodiments, the gas flow control valve comprises a valve body central axis, wherein the exit port comprises an exit port central axis, and wherein the exit port central axis is angled between 20 and 85 degrees relative to the valve body central axis.

According to additional embodiments, the gas flow control valve comprises a valve body central axis, wherein the exit port comprises an exit port central axis, and wherein the exit port central axis is angled between 40 and 50 degrees relative to the valve body central axis.

Another non-limiting embodiment of the present invention includes a method of manufacturing a flow control valve comprising: affixing the distal portion of a threaded shaft to a handle; installing the threaded shaft into a threaded bore of a threaded member and a proximal portion of the handle into a sliding bore of the threaded member; affixing a valve needle to the proximal portion of a threaded shaft; sourcing a readily available socket style 45 degree wye fitting comprising a socket formed therein each opening of the wye fitting; machining a bore from the distal portion of the wye fitting producing a valve seat in the proximal portion; and inserting the proximal end of the threaded member into the distal end of the valve body and affixing the threaded member to the valve body.

According to additional embodiments, the method further comprises inserting a distal portion of PVC pipe into the proximal socket of the valve body and affixing the PVC pipe to the valve body and affixing a coupling means to a proximal portion of the PVC pipe.

According to additional embodiments, the method further comprises inserting a PVC pipe into the exit port socket of the valve body and affixing the PVC pipe to the valve body and coupling an extraction member to the PVC pipe.

According to additional embodiments, affixing the threaded member to the valve body comprises inserting at least one retention member into at least one retention bore passing through the valve body and into the threaded member.

According to additional embodiments, affixing a valve needle to the proximal portion of a threaded shaft comprises inserting a retention member through a retention bore passing through the valve needle and threaded member.

According to additional embodiments, the method further comprises machining sealing recesses into the threaded member, the handle, and the valve needle configured to accept a sealing member.

According to additional embodiments, the valve needle comprises a tapered portion and a shoulder, wherein the tapered portion of the valve needle comprises a truncated cone which increases in diameter in the direction of gas flow.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements.

FIG. 1 illustrates a perspective view of one embodiment of a flow control valve coupled to a measurement tube of a well head.

FIG. 2 illustrates a perspective view of the flow control valve of FIG. 1 coupled to the measurement tube.

FIG. 5A illustrates a perspective view of one embodiment of a rotating assembly.

FIG. 5B illustrates a cross section view of the rotating assembly of FIG. 5A.

FIG. 6A illustrates a perspective view of one embodiment of a threaded member.

FIG. 6B illustrates a cross section view of the threaded member of FIG. 6A.

DETAILED DESCRIPTION

Figure 3A:
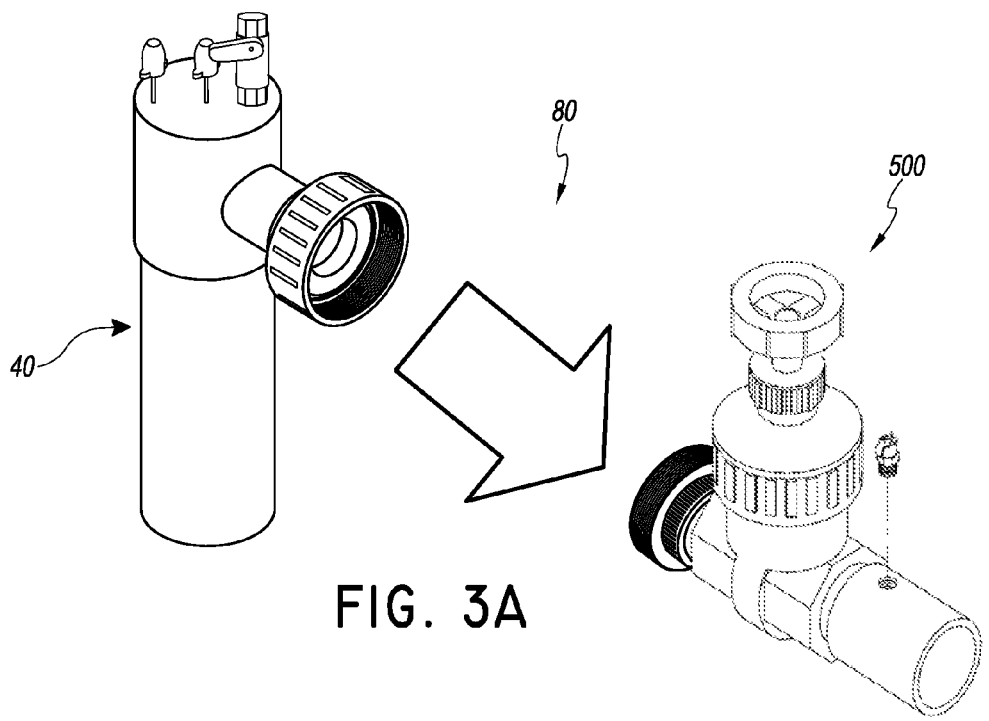
FIG. 3A illustrates a perspective view of gate valve being decoupled from a measurement tube.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention.

Descriptions of unnecessary parts or elements may be omitted for clarity and conciseness, and like reference numerals refer to like elements throughout. In the drawings, the size and thickness of layers and regions may be exaggerated for clarity and convenience.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

Embodiments described herein generally relate to systems, devices, and methods related to gas flow control valves 100. More specifically, some embodiments relate to gas flow control valves 100 configured to finely tune the flow rate of gas extraction from solid waste landfills. When used herein, "flow rate" is used in reference to the volumetric flow rate passing through the flow control valve 100.

FIG. 1 illustrates a perspective view of one embodiment of a flow control valve 100 coupled to a measurement tube 40 of a well head 10. Often, well heads 10 are utilized in landfills to provide a point above the surface to access the gas well below the surface. In one embodiment, a measurement tube 40 is connected to the well casing 20 of the well head 10. In some embodiments, an adapter 30 is utilized to couple the measurement tube 40 to the well head 10. The well head 10 can provide an access point for technicians in the field to obtain measurements regarding the gas within the well and to extract gas from the well. In some embodiments, a valve can be coupled to the measurement tube 40, allowing a technician to adjust the rate of gas flowing through the valve and thus the rate of gas extraction from the well head 10. In some embodiments, an extraction member 70 can be coupled to the valve to capture the gases which pass through the well head 10 and the valve. The extraction member 70 can be a flexible hose which can affixed to a piece of pipe extending out of the flow control valve 100.

Typically, a valve will comprise a gate valve 500, such as the one illustrated in FIG. 3A, for throttling the flow rate of gas through the well head 10 and the valve. Gate valves 500 and similar alternatives may be effective at limiting the flow exiting a well head 10 at high flow rates, however it can be difficult to finely tune the rate of flow exiting the well head 10 with a gate valve 500, particularly at low flow rates.

An operating goal of landfills is to remove gas at the approximate rate of its generation. Therefore, in some embodiments, the valve can comprise a flow control valve 100 as illustrated in FIG. 1. The flow control valve 100 is configured to accurately set the flow rate of gas flowing through the flow control valve 100 and exiting the well head 10, especially when the desired rate of extraction and thus the desired flow rate through the flow control valve 100 is low and/or when a precise flow rate and/or a small adjustment to a current flow rate of a well head are necessary. In some embodiments, the flow control valve 100 can be configured to throttle the flow rate in a linear fashion as the flow control valve 100 is adjusted. In some embodiments, the flow control valve 100 can be configured to throttle flow between approximately 0 and 200 cubic feet/minute (cfm). In some embodiments, the flow control valve 100 can be configured to throttle flow between approximately 0 and 100 cfm. In some embodiments, the flow control valve 100 can be configured to throttle flow between approximately 0 and 50 cfm. In some embodiments, the flow control valve 100 can be configured to throttle flow between approximately 5 and 50 cfm. In some embodiments, the flow control valve 100 can be configured to throttle flow between approximately 5 and 40 cfm. In some embodiments, the flow control valve 100 can be configured to throttle flow between approximately 20 and 40 cfm. Low flow rates are considered flow rates below approximately 50 cfm or below a particular percentage of a maximum (open) flow rate, such as 5%, 10%, or 20% of the maximum flow rate.

FIG. 2 illustrates a perspective view of the flow control valve 100 of FIG. 1 coupled to the measurement tube 40. The measurement tube 40 can incorporate sensor ports 50 allowing a technician to take measurements of the gas within the well. These measurements can include, for example, the pressure of the gas within the well head 10 or the concentrations of constituents in the gas, such as methane, carbon dioxide, nitrogen, and oxygen. The flow of gas can travel from the well head 10 through the measurement tube 40 and into the proximal portion 101 of the flow control valve 100 towards the distal portion 102 of the flow control valve 100. The flow of gas can exit the flow control valve 100 through the exit port 205 of the valve body 200. The flow control valve 100 can also include a threaded member 400 and a handle 310. The measurement tube 40 can also incorporate a mating portion 60 extending outwards and configured to couple to a valve.

Figure 3B:
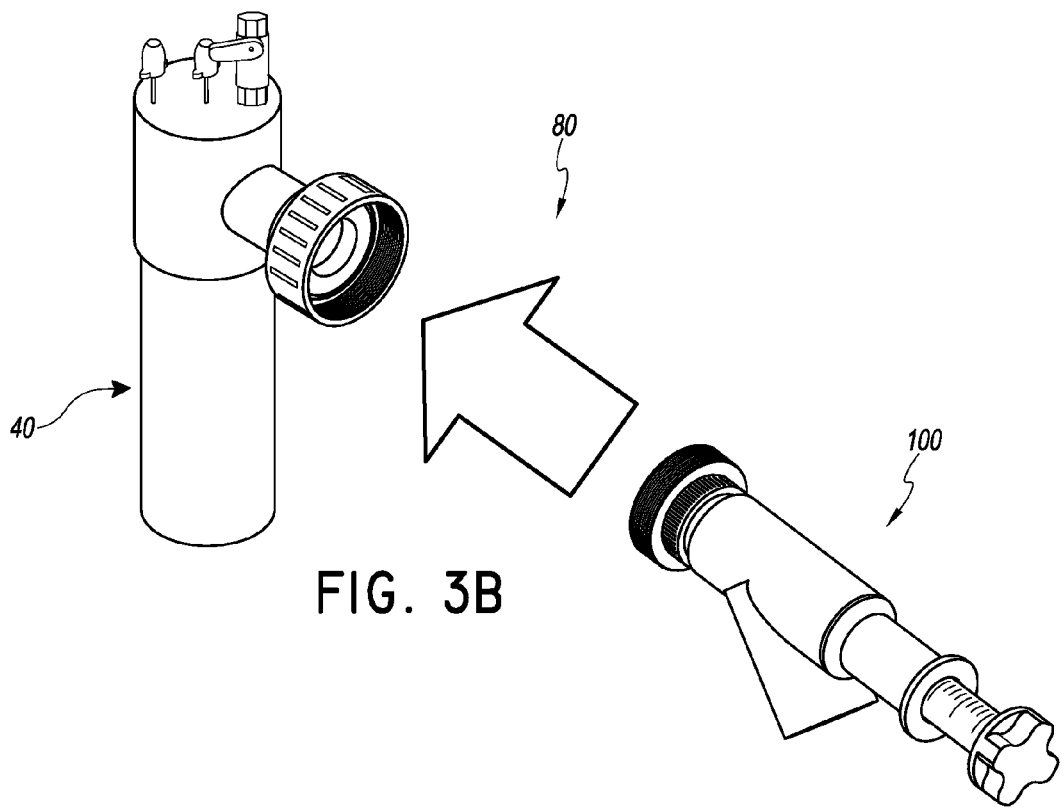
FIG. 3B illustrates a perspective view of the flow control valve of FIG. 1 being coupled to the measurement tube of FIG. 3A.
Figure 7:
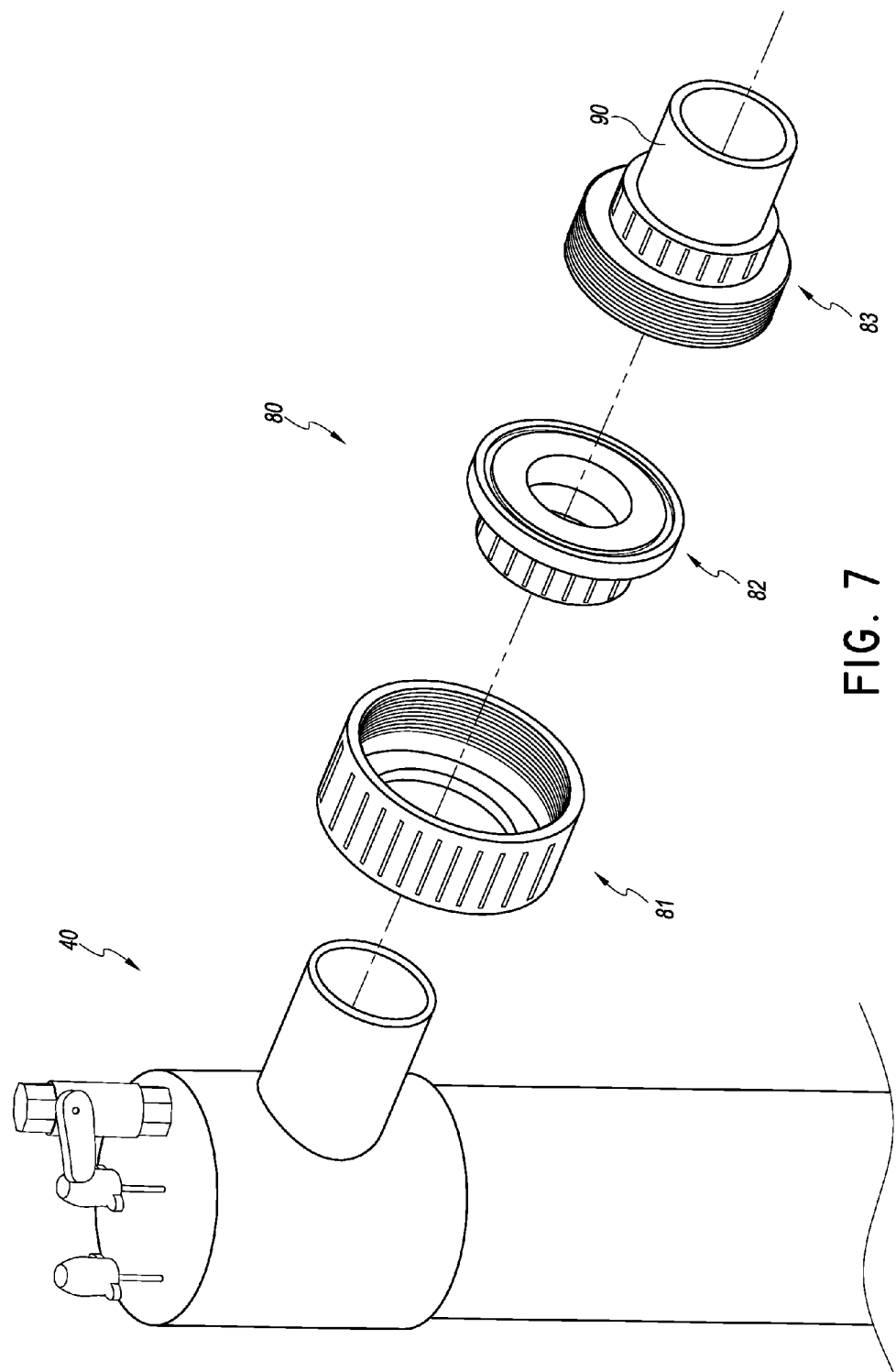
FIG. 7 illustrates an exploded view of the union of FIG. 2.

FIGS. 3A and 3B illustrates how the flow control valve 100 may be easily retrofitted into a landfill gas system currently using other types of valves, such as the illustrated gate valve 500. FIG. 3A illustrates a perspective view of gate valve 500 being decoupled from a measurement tube 40. FIG. 3B illustrates a perspective view of the flow control valve 100 of FIG. 1 being coupled to the measurement tube 40 of FIG. 3A. In some embodiments, the flow control valve 100 can couple to the measurement tube 40 via a union 80. In some embodiments, the union 80 can be a quick disconnect fitting as illustrated in FIG. 7. One advantage to the embodiments of the flow control valve 100 is that it has the capability of mating to well heads 10 utilizing existing union designs. FIGS. 3A and 3B illustrate how an existing gate valve 500 can be decoupled from a measurement tube 40 and the flow control valve 100 can quickly and easily be installed in place of the gate valve 500.

Figure 4A:
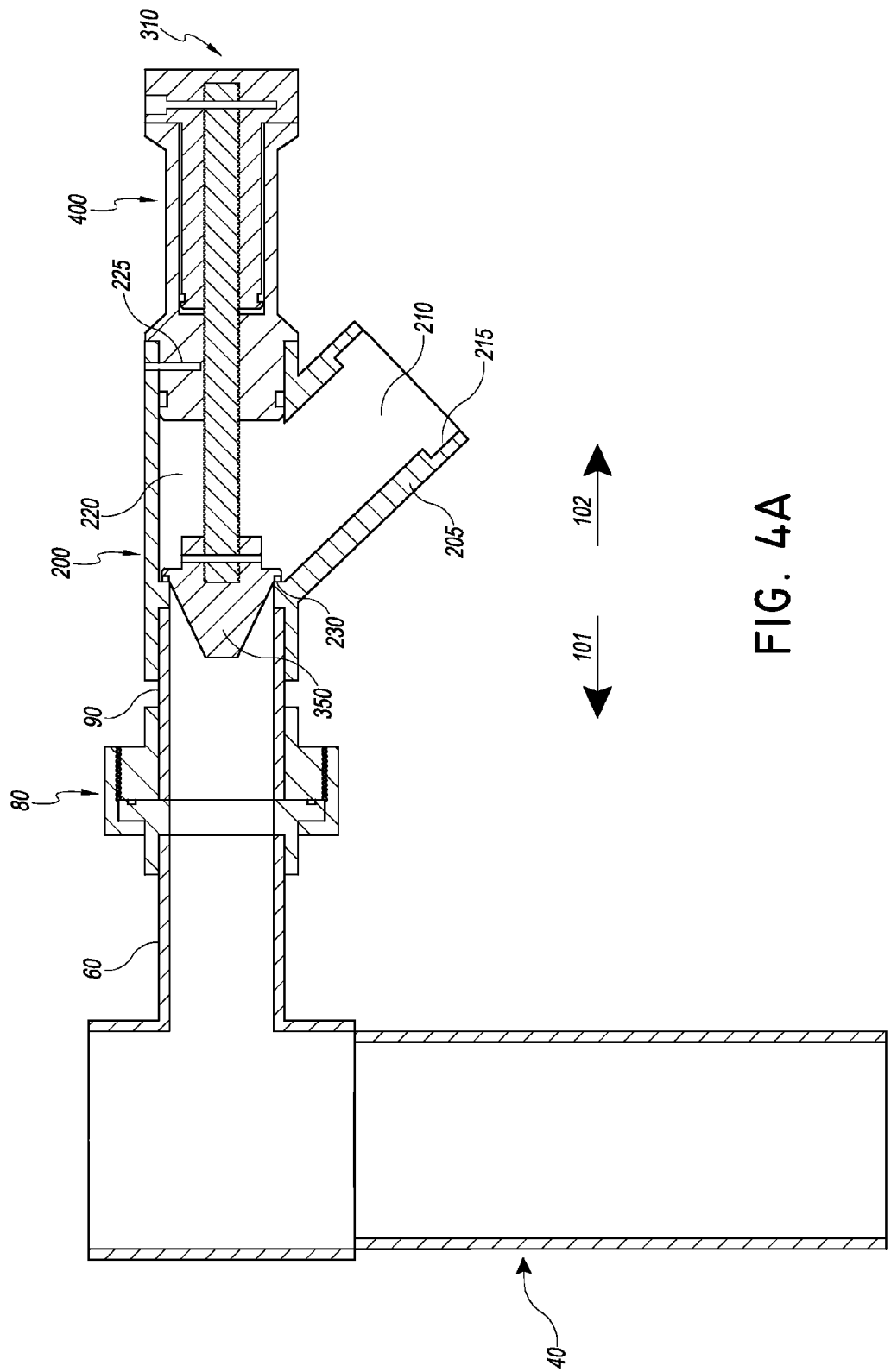
FIG. 4A illustrates a cross section view of the flow control valve of FIG. 1 in a closed position and coupled to a measurement tube.
Figure 4B:
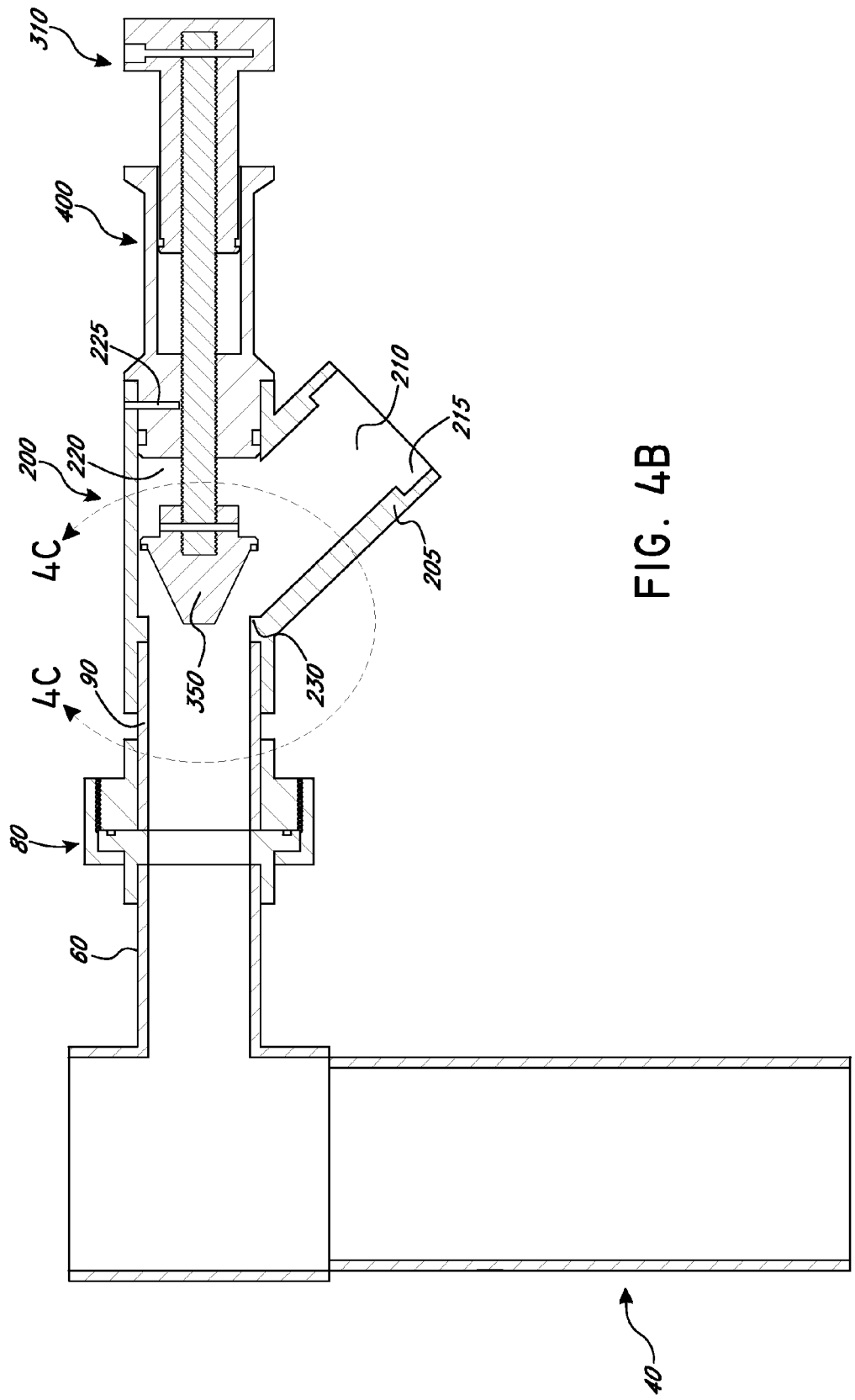
FIG. 4B illustrates a cross section view of the flow control valve of FIG. 1 in an open position and coupled to a measurement tube.
Figure 4C:
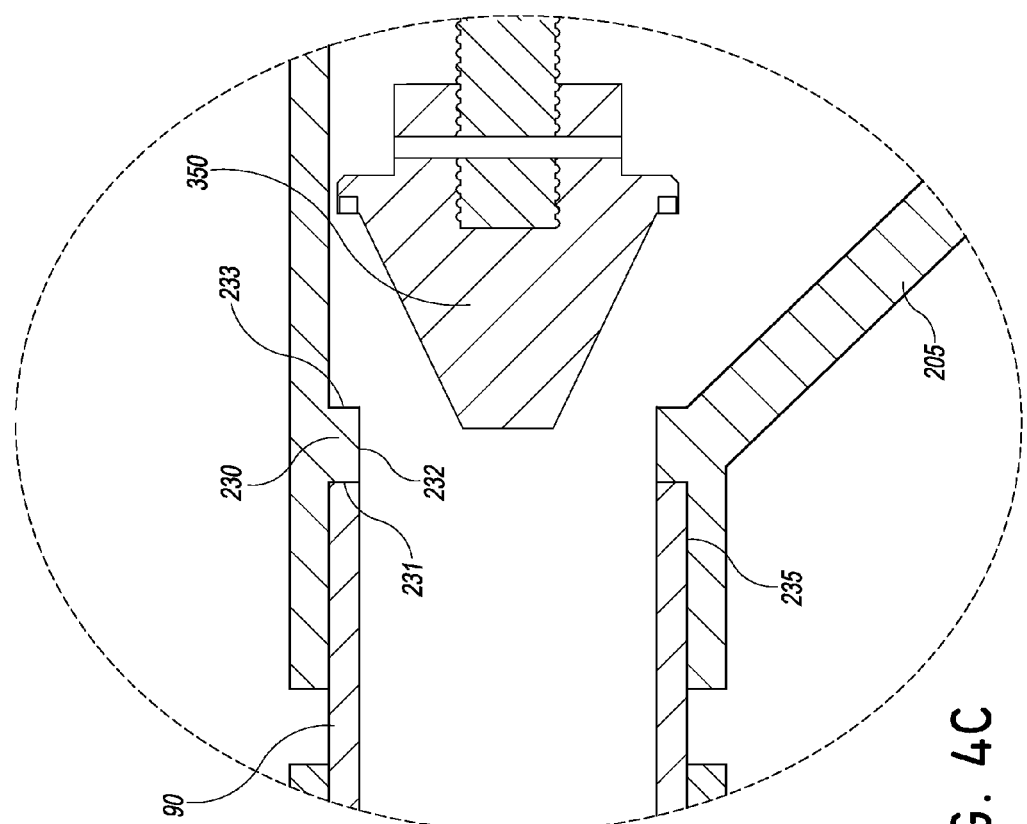
FIG. 4C illustrates a supplementary view of the cross section of the flow control valve of FIG. 4B.

FIG. 4A illustrates a cross section view of the flow control valve 100 of FIG. 1 in a closed position (e.g., no flow out of the exit port 205) and coupled to a measurement tube 40. FIG. 4B illustrates a cross section view of the flow control valve 100 of FIG. 1 in an open position (e.g., gas flows out of the exit port 205) and coupled to a measurement tube 40. FIG. 4C illustrates a supplementary view of the cross section of the flow control valve 100 of FIG. 4B.

In some embodiments, the flow control valve 100 comprises a valve body 200. The proximal portion of the valve body 200 can be coupled to the measurement tube 40 via a union 80. In some embodiments, an intermediate tube 90 can be utilized to affix the valve body 200 to the union 80. The valve body 200 can comprise the portion of the flow control valve 100 which throttles the flow rate of gas travelling through the flow control valve 100. In some embodiments, the valve body 200 of the flow control valve 100 can include a central bore 220 having a valve body 200 central axis. The flow control valve 100 can also include an exit port 205 having an exit port 205 central axis. The exit port 205 can include an exit bore 210, the exit bore 210 being in fluid communication with the central bore 220 of the valve body 200.

In some embodiments, the central bore 220 of the valve body 200 has a valve body 200 central axis and the exit bore 210 of the exit port 205 has an exit port 205 central axis. In some embodiments, rather than being perpendicular to the valve body 200, the exit port 205 includes a shallower angle relative to the valve body 200 as illustrated in FIG. 4A. In one embodiment, the exit port 205 central axis is angled between 10 and 80 degrees relative to the valve body 200 central axis. In another embodiment, the exit port 205 central axis is angled between 20 and 70 degrees relative to the valve body 200 central axis. In another embodiment, the exit port 205 central axis is angled between 30 and 60 degrees relative to the valve body 200 central axis. In another embodiment, the exit port 205 central axis is angled between 40 and 50 degrees relative to the valve body 200 central axis. In another embodiment, the exit port 205 central axis is angled approximately 45 degrees relative to the valve body 200 central axis.

The shallow angle between the exit port 205 central axis and the valve body 200 central axis may allow for smoother and/or less inhibited flow through the valve body 200 as compare to other valves that require the gas to turn a complete 90 degrees as would be the case if the exit port 205 central axis was angled 90 degrees to the valve body 200 central axis. Additionally, the shallower angle may promote laminar flow, minimizing turbulence within the valve body 200, and promoting more consistent and accurate flow rates through the flow control valve 100, especially at low flow rates.

In some embodiments, the valve body 200 can include a valve seat 230 configured to complement the valve needle 350 and accurately control the flow rate of gas travelling through the flow control valve 100, or as illustrated in FIG. 4A, inhibit the flow of gas through the flow control valve 100. In some embodiments, the valve seat 230 can comprise a protrusion into the central bore 220 of the valve body 200. In some embodiments, the valve seat 230 can be integral to the valve body 200 construction. In another embodiment, the valve seat 230 can be a separate portion affixed to the valve body 200 (not illustrated). In another embodiment, the distal end of the intermediate tube 90 can form the valve seat 230 (not illustrated). In one embodiment, the valve body 200 incorporates a proximal socket 235 to accept the intermediate tube 90. In some embodiments, the intermediate tube 90 can abut the proximal face 231 of the valve seat 230. In some embodiments, the valve seat 230 can include an inner face 232. In some embodiments, the inner face 232 is substantially parallel to the valve body 200 central axis. In some embodiments, the inner face 232 of the valve seat 230 can be configured to match the inner diameter of the intermediate tube 90, ensuring smooth flow into the valve body 200 and accurate and consistent tuning of the flow rate by the flow control valve 100. In some embodiments, the inner face 232 of the valve seat 230 can be angled to complement the surface of the valve needle 350. In some embodiments, the valve seat 230 can include a distal face 233. In some embodiments, the distal face 233 of the valve seat 230 is configured to seal against the valve needle 350 when the flow control valve 100 is in a closed position.

In some embodiments, the flow control valve 100 can also comprise a threaded member 400 having a proximal portion 401 and a distal portion 402. The proximal portion 401 of the threaded member 400 can be affixed to the distal portion of the valve body 200. The threaded member 400 has a threaded member 400 central axis. In some embodiments, the threaded member 400 central axis is collinear with the valve body 200 central axis. In some embodiments, the proximal portion 401 of the threaded member 400 can slide within the distal portion of the valve body 200. In some embodiments, the valve body 200 and the threaded member 400 can each include at least one retention bore 225, 406 configured to line up with one another such that a retention member, which may include for example, a fastener or a pin, can pass through both the valve body 200 and the threaded member 400, affixing the valve body 200 to the threaded member 400. In one embodiment, a plurality of retention bores 225, 406 can be spaced evenly around the valve body 200 central axis. In some embodiments, the threaded member 400 can include a threaded bore 403 and a sliding bore 404.

In some embodiments, the flow control valve 100 can include a rotating assembly 300 (see FIG. 5A). The rotating assembly 300 can comprise a handle 310, a threaded shaft 330, and a valve needle 350. In some embodiments, the handle 310 is affixed to the threaded shaft 330 and the threaded shaft 330 is affixed to the valve needle 350. The rotating assembly 300 can be configured to rotate around the valve body 200 central axis and translate along the valve body 200 central axis. In some embodiments, the threaded bore 403 of the threaded member 400 is configured to accept the threaded shaft 330 of the rotating assembly 300 and rotation of the rotating assembly 300 relative to the threaded member 400 causes the rotating assembly 300 to translate relative to the threaded member 400. In some embodiments, the valve seat 230 of the valve body 200 is configured to receive the valve needle 350 of the rotating assembly 300 such that translation of the valve needle 350 relative to the valve seat 230 alters the flow rate of gas travelling through the flow control valve 100. In some embodiments, the exit bore 210 of the exit port 205 of the valve body 200 is located distally from the valve seat 230 of the valve body 200 such that when the flow control valve 100 is in an open position and the valve needle 350 is translated away from the valve seat 230, as illustrated in FIG. 4B, gas can flow through the flow control valve 100 and out the exit port 205, but when the valve needle 350 is in a closed position, as illustrated in FIG. 4B, gas from the well head 10 is not allowed to flow through the flow control valve 100 and out the exit port 205.

In some embodiments, the flow rate of the flow control valve 100 can be adjusted by a technician in the field. In order to increase the amount of flow, the handle 310 can be rotated in a first direction, causing the rotating assembly 300, and thus the valve needle 350, to translate distally away from the valve seat 230 of the valve body 200, increasing the gap between the valve needle 350 and the valve seat 230. In order to decrease the amount of flow, the handle 310 can be rotated in a second direction. The handle 310 can also include measurement indicia 314 configured to indicate the relative longitudinal position of the rotating assembly 300 in relation to the threaded member 400, and thus the valve body 200 and the valve seat 230. The longitudinal position refers to the displacement of the rotating assembly 300 along the valve body 200 central axis. The measurement indicia 314 can be utilized to adjust the flow control valve 100 in order to achieve the desired flow rate. In some embodiments, the flow control valve 100 can include a correlation between the position of the rotating assembly 300 as indicated by the measurement indicia 314 and the flow rate of the flow control valve 100. In some embodiments, the measurement indicia 314 are configured to be read relative to the threaded member 400. In some embodiments, the measurement indicia 314 can be located on the threaded member 400 and read relative to the location of the handle 310 (not illustrated).

In some embodiments, a technician can utilize data provided from sensors, such as the gas pressure within the well head 10, to choose the appropriate position of the rotating assembly 300 in order to achieve the desired flow rate. In some embodiments, the pitch of the threaded bore 403 of the threaded member 400 and the threaded shaft 330 of the rotating assembly 300 are configured such that each turn of the handle 310 with regards to a particular pressure, produces a particular change in flow rate, allowing quick and easy adjustment of the flow control valve 100 in the field. In some embodiments, the pitch of the threaded bore 403 of the threaded member 400 and the threaded shaft 330 of the rotating assembly 300 are configured such that several turns of the handle 310 are required to span the adjustable range of flow rate provided by the flow control valve 100. In some embodiments, at least 4 turns of the rotating assembly 300 is required to span the adjustable range of flow rate provided by the flow control valve 100. In some embodiments, at least 6 turns of the rotating assembly 300 is required to span the adjustable range of flow rate provided by the flow control valve 100. In some embodiments, at least 8 turns of the rotating assembly 300 is required to span the adjustable range of flow rate provided by the flow control valve 100. In some embodiments, at least 10 turns of the rotating assembly 300 is required to span the adjustable range of flow rate provided by the flow control valve 100. In some embodiments, at least 12 turns of the rotating assembly 300 is required to span the adjustable range of flow rate provided by the flow control valve 100. In some embodiments, at least 14 turns of the rotating assembly 300 are required to span the adjustable range of flow rate provided by the flow control valve 100. In some embodiments, at least 16 turns of the rotating assembly 300 are required to span the adjustable range of flow rate provided by the flow control valve 100. In some embodiments, at least 18 turns of the rotating assembly 300 are required to span the adjustable range of flow rate provided by the flow control valve 100. In some embodiments, at least 20 turns of the rotating assembly 300 are required to span the adjustable range of flow rate provided by the flow control valve 100. In some embodiments, at least 22 turns of the rotating assembly 300 are required to span the adjustable range of flow rate provided by the flow control valve 100. In some embodiments, at least 24 turns of the rotating assembly 300 are required to span the adjustable range of flow rate provided by the flow control valve 100. In some embodiments, at least 26 turns of the rotating assembly 300 are required to span the adjustable range of flow rate provided by the flow control valve 100. In some embodiments, the number of turns necessary for the flow control valve 100 to span the adjustable range of flow rate can depend on the particular valve needle utilized in the flow control valve 100.

FIG. 5A illustrates a perspective view of one embodiment of a rotating assembly 300. FIG. 5B illustrates a cross section view of the rotating assembly 300 of FIG. 5A. In some embodiments, the proximal portion 311 of the handle 310 is configured to slide within the sliding bore 404 of the threaded member 400. In some embodiments, the proximal portion 311 of the handle 310 can include a sealing recess 313 configured to accept a sealing member. A sealing member can include for example, an O-ring. The sealing member can create a seal between the handle 310 and the threaded member 400, ensuring the valve does not leak and produces an accurate and consistent flow rate. In some embodiments, the handle 310 is configured to be manipulated by a technician. In some embodiments, the distal portion 312 of the handle 310 can include at least one recessed portion 316 and at least one gripping portion 315 to create a surface to grip while rotating the handle 310. In some embodiments, the handle 310 and the threaded shaft 330 can each include at least one retention bore 317 configured to line up with one another such that a retention member, which may include for example, a fastener or a pin, can pass through both the handle 310 and the threaded shaft 330, affixing the handle 310 to the threaded shaft 330.

In some embodiments, the valve needle 350 can include a tapered portion 351. The tapered portion 351 can be a cone structure where the outside diameter of the tapered portion 351 increases when going from the proximal end to the distal end of the tapered portion 351 of the valve needle 350 (in the direction of gas flow). The gradual increase in diameter distally along tapered portion 351 of the valve needle 350 may promote laminar flow, minimizing turbulence within the valve body 200, and promoting more consistent and accurate flow rates through the flow control valve 100, especially at low flow rates. In some embodiments, the tapered portion 351 can be truncated such that the tapered portion 351 does not come to a tip, but instead forms a proximal face 353. In some embodiments, the proximal face 353 could be rounded or spherical in shape. In some embodiments, the tapered portion 351 can comprise a tapered surface 352 much like a cone, which is flat when viewed in section as illustrated in FIG. 5B. In some embodiments, the tapered surface 352 can be angled relative to the central axis of the rotating assembly 300. In another embodiment, the valve needle 350 can comprise a curved profile (not illustrated). In another embodiment, the valve needle 350 can include a parabolic shape. In some embodiments, the tapered portion 351 of the valve needle 350 can include flutes in the tapered surface 352 (not illustrated). Flutes can promote more accurate flow control at low flow rates. Thus, in some embodiments, a valve needle with one or more flutes may be used for fine control at lower flow rates, and a valve needle without flutes, and possibly of a different design, may be used for fine control at higher flow rates.

In some embodiments, the valve needle 350 can include a shoulder 354. In some embodiments, the shoulder 354 can comprise an annular protrusion projecting outwards from center of the valve needle 350. In some embodiments, the shoulder 354 includes a shoulder proximal face 355 configured to seal with the valve seat 230 of the valve body 200 when the flow control valve 100 is in a closed position. In some embodiments, the shoulder 354 can include a sealing recess 356 configured to accept a sealing member. The sealing member can help the shoulder 354 of the valve needle 350 seal against the valve seat 230 of the valve body 200 when the flow control valve 100 is in a closed position. In some embodiments, the sealing recess 356 can be included in the shoulder proximal face 355. In some embodiments, the valve needle 350 and the threaded shaft 330 can each include at least one retention bore 357 configured to line up with one another such that a retention member, which may include for example, a fastener or a pin, can pass through both the valve needle 350 and the threaded shaft 330, affixing the valve needle 350 to the threaded shaft 330. In another embodiment, the threaded shaft 330 may be retained longitudinally to the valve needle 350, but allowed to rotate relative to the valve needle 350.

In some embodiments, the valve needle 350 can be configured to be interchangeable. For example, the flow control valve 100 can include a plurality of valve needles that are interchangeable in order to allow the operator to select a most appropriate valve needle to provide flow control that is most appropriate for the particular flow control valve. In some embodiments, particular valve needle configurations can be configured to accurately throttle flow rates within a particular range of flow rates. In some embodiments, the flow control valve 100 can include a plurality of valve needles, wherein each valve needle is configured to accurately throttle flow rates within a particular range of flow rates, wherein each range is different. The flow control valve 100 can include, for example, a valve needle configured to accurately throttle flow between approximately 5 and 20 cfm, an additional valve needle configured to accurately throttle flow between approximately 20 and 40 cfm, an additional valve needle configured to accurately throttle flow between approximately 40 and 100 cfm, and an additional valve needle configured to accurately throttle flow between approximately 100 and 200 cfm. A plurality of interchangeable valve needles allow the flow control valve 100 to accurately throttle flow over a wide range of flow rates without replacing the entire flow control valve 100. In one embodiment, a flow control valve 100 may be packaged and/or sold in a kit that includes multiple valve needles having different flow rate ranges at which optimal control is possible. For example, a kit may be configured to include any two or more of the example valve needles noted above.

FIG. 6A illustrates a perspective view of one embodiment of a threaded member 400. FIG. 6B illustrates a cross section view of the threaded member 400 of FIG. 6A. In some embodiments, the proximal portion 401 of the threaded member 400 can include sealing recess 405 configured to accept a sealing member. The sealing member can help the proximal portion 401 of the threaded member 400 seal against the distal portion of the valve body 200. In some embodiments, the threaded member 400 can include a proximal annular protrusion 407 configured to abut the distal end of the valve body 200. In some embodiments, the threaded member 400 can include a distal annular protrusion 408. In some embodiments, the distal most portion of the threaded member 400, the distal surface 409, can be a reference point from which to read the measurement indicia 314 on the handle 310 of the rotating assembly 300.

In some embodiments, the threaded member 400 can include a threaded bore 403. The threaded bore 403 can enter from the proximal portion 401 of the threaded member 400. The threaded bore 403 can be configured to accept the threaded shaft 330 of the rotating assembly 300. In some embodiments, the threaded member 400 can include a sliding bore 404. The sliding bore 404 can enter from the distal portion 402 of the threaded member 400. The sliding bore 404 can be configured to accept the proximal portion 311 of the handle 310 of the rotating assembly 300. The threaded bore 403 can be in fluid communication with the sliding bore 404.

FIG. 7 illustrates an exploded view of the union 80 of FIG. 2. In some embodiments, the union 80 can allow for quick and easy installation of the flow control valve 100 to a measurement tube 40. In some embodiments, the union 80 comprises a retention nut 81, a flange 82, and a quick connect 83. The flange 82 is configured to be affixed to one portion of the system, which may include for example the mating portion 60 of the measurement tube 40, and the quick connect 83 is configured to be affixed to another portion of the system, which may include for example the intermediate tube 90 affixed to the valve body 200 of the flow control valve 100. The retention nut 81 can include internal threads and is configured to abut against the flange 82, and to thread onto a set of external threads located on the quick connect 83, forcing the flange 82 and quick connect 83 together when the retention nut 81 is rotated relative to the quick connect 83. In some embodiments, the flange 82 can include a sealing recess configured to accept a sealing member.

In some embodiments, various portions of the flow control valve 100 can be manufactured from any suitable material or combination of materials which may include, for example, metals and alloys such as for example, aluminum, steel, stainless steel, titanium, iron, alloy, non-metal materials such as for example, polymers, carbon, ceramics and other non-metallic materials such as plastic, thermoplastic, thermoset, acrylonitrile butadiene styrene, polycarbonate acetal, acrylic, nylon, polybutylene terephthalate, polyester liquid crystal polymer, polypropylene, polycarbonate, polyimide, polythelene, carbon fiber, or combinations thereof. In some embodiments, portions of the flow control valve 100 may be manufactured from Polyvinyl chloride ("PVC"). In some embodiments, portions of the flow control valve 100 may be manufactured from PVC pipe. In some embodiments, portions of the flow control valve 100 can be machined form a solid piece of material or may include machining processes completed on existing parts. In one embodiment, portions of the flow control valve 100 may be formed in an injection molded process. In another embodiment, portions of the flow control valve 100 can be formed via extrusion, casting, thermoforming, compression molding, blow molding, transfer molding, machining, three dimensional printing or any combination thereof. In one embodiment, the material may be reinforced with glass or carbon fibers. In some embodiments, different portions of the flow control valve 100 can be affixed to one another using securing means which may include, for example fasteners, clips, adhesive, cement, welding, press fits, interference fits, friction, clamps, etc.

In some embodiments, the valve body 200 can be manufactured by machining an existing and readily available component. In one embodiment, a wye fitting, such as the socket x socket x socket schedule 80 wye fitting from Spears of Sylmar, Calif., can be sourced and machined to create the valve body 200. The fitting can include a socket at each opening. In one embodiment, a bore can be machined from the distal portion of the wye fitting producing a valve seat 230 in the proximal portion. In one embodiment, the boring process involves extending the distal socket almost all the way to the proximal socket 235, leaving a small amount of material which forms the valve seat 230.

In some embodiments, the flow control valve 100 can be manufactured by affixing the distal portion of a threaded shaft 330 to a handle 310, installing the threaded shaft 330 into a threaded bore 403 of the threaded member 400 and a proximal portion 311 of the handle 310 into the sliding bore 404 of the threaded member 400, affixing the valve needle 350 to the proximal portion of the threaded shaft 330, and inserting the proximal portion 401 of the threaded member 400 into the distal end of the valve body 200 and affixing the threaded member 400 to the valve body 200. In some embodiments, a distal portion of PVC pipe is inserted into the proximal socket 235 of the valve body 200 and affixed to the valve body 200. In some embodiments, a coupling means, which may include a portion of a union 80 such as a quick connect 83, can be coupled to the PVC pipe. In some embodiments, another PCV pipe can be inserted into the exit port 205 socket 215 of the valve body 200 and affixed to the valve body 200 and an extraction member 70, such as a flexible hose, can be coupled to the PVC pipe.

Various modifications to the implementations described in this disclosure may be readily apparent to those skilled in the art, and the generic principles defined, herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

What is claimed is:

1. A gas flow control valve comprising:
   a valve body having a central bore and an exit port, the central bore of the valve body having a valve body central axis, the exit port having an exit bore in fluid communication with the central bore, the exit port of the valve body having an exit port central axis, the exit port central axis of the exit port angled between 20 and 85 degrees relative to the valve body central axis;
   wherein the valve body has a proximal portion and a distal portion, wherein gas enters the valve body through the proximal portion and exits through the exit port;
   a threaded member having a proximal portion and a distal portion, the proximal portion of the threaded member affixed to the distal portion of the valve body, the threaded member having a threaded member central axis collinear with the valve body central axis, the threaded member comprising a threaded bore and a sliding bore, the threaded bore entering from the proximal portion of the threaded member and the sliding bore entering from the distal portion of the threaded member, the threaded bore in fluid communication with the sliding bore;
   a rotating assembly configured to rotate about the valve body central axis and to translate along the valve body central axis, the rotating assembly comprising a handle affixed to a threaded shaft affixed to a valve needle, the handle including a proximal portion and a distal portion, the proximal portion of the handle configured to slide within the sliding bore of the threaded member, the proximal portion including measurement indicia configured to indicate the longitudinal position of the rotating assembly relative to the threaded member;
   wherein the threaded bore of the threaded member is configured to accept the threaded shaft of the rotating assembly and wherein rotation of the rotating assembly relative to the threaded member causes the rotating assembly to translate relative to the threaded member;
   wherein the valve body includes a valve seat configured to receive the valve needle of the rotating assembly such that translation of the valve needle relative to the valve seat alters the flow rate of gas travelling through the gas flow control valve;
   wherein the exit bore of the exit port is located distally from the valve seat of the valve body;
   wherein the valve needle comprises a tapered portion; and
   wherein the sliding bore of the threaded member is configured to accept the proximal portion of the handle of the rotating assembly.

2. The gas flow control valve of claim 1, wherein the tapered portion of the valve needle increases in diameter in the direction of gas flow.

3. The gas flow control valve of claim 2, wherein the tapered portion of the valve needle comprises a truncated cone.

4. The gas flow control valve of claim 1, wherein the valve needle further comprises a shoulder protruding outwards from the center of the valve needle, wherein the shoulder is configured to seal with the valve seat when the flow control valve is in a closed position.

5. The gas flow control valve of claim 4, wherein the shoulder comprises a proximal face, wherein the proximal face comprises a sealing recess configured to accept a sealing member configured to seal against the valve seat.

6. The gas flow control valve of claim 1, wherein the exit port central axis of the exit port angled between 40 and 50 degrees relative to the valve body central axis.

7. The gas flow control valve of claim 1, wherein the threaded bore of the threaded member and the threaded shaft have a thread pitch configured such that at least 6 turns of the rotating assembly is required to span an adjustable range of flow rate provided by the gas flow control valve.

8. The gas flow control valve of claim 1, wherein the proximal portion of the handle comprises a sealing recess configured to receive a sealing device configured to seal the sliding bore of the threaded member.

9. The gas flow control valve of claim 1, wherein the measurement indicia of the handle are configured to be read relative to a distal surface of the threaded member.

10. The gas flow control valve of claim 1, wherein the flow control valve is configured to quickly and easily couple to an existing measurement tube via a union.

11. A method of manufacturing a flow control valve comprising:
    affixing distal portion of a threaded shaft to a handle;
    installing the threaded shaft into a threaded bore of a threaded member and a proximal portion of the handle into a sliding bore of the threaded member;
    affixing a valve needle to the proximal portion of a threaded shaft;
    sourcing a readily available socket style 45 degree wye fitting comprising a socket formed therein each opening of the wye fitting;
    machining a bore from the distal portion of the wye fitting producing a valve seat in the proximal portion; and
    inserting the proximal end of the threaded member into the distal end of the valve body and affixing the threaded member to the valve body.

12. The method of claim 11, further comprising inserting a distal portion of PVC pipe into the proximal socket of the valve body and affixing the PVC pipe to the valve body and affixing a coupling means to a proximal portion of the PVC pipe.

13. The method of claim 11, further comprising inserting a PVC pipe into the exit port socket of the valve body and affixing the PVC pipe to the valve body and coupling an extraction member to the PVC pipe.

14. The method of claim 11, wherein affixing the threaded member to the valve body comprises inserting at least one retention member into at least one retention bore passing through the valve body and into the threaded member.

15. The method of claim 11, wherein affixing a valve needle to the proximal portion of a threaded shaft comprises inserting a retention member through a retention bore passing through the valve needle and threaded member.

16. The method of claim 11, further comprising machining sealing recesses into the threaded member, the handle, and the valve needle configured to accept a sealing member.

17. The method of claim 11, wherein the valve needle comprises a tapered portion and a shoulder, wherein the tapered portion of the valve needle comprises a truncated cone which increases in diameter in the direction of gas flow.

\* \* \* \* \*